(12) United States Patent
Alapati et al.

(10) Patent No.: US 9,021,281 B2
(45) Date of Patent: *Apr. 28, 2015

(54) RUN-TIME TASK-LEVEL DYNAMIC ENERGY MANAGEMENT

(71) Applicant: International Business Machines Corporation, Armonk, NY (US)

(72) Inventors: Sangram Alapati, Austin, TX (US); Amit Dugar, Jodhput (IN); Prathiba Kumar, Udumalpet (IN); Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,383

(22) Filed: Nov. 12, 2013

(65) Prior Publication Data

US 2014/0075219 A1    Mar. 13, 2014

Related U.S. Application Data

(63) Continuation of application No. 13/289,415, filed on Nov. 4, 2011, now Pat. No. 8,904,208.

(51) Int. Cl.
*G06F 1/26* (2006.01)
*G06F 1/32* (2006.01)
*G06F 1/00* (2006.01)

(52) U.S. Cl.
CPC .............. *G06F 1/3296* (2013.01); *G06F 1/324* (2013.01); *G06F 1/329* (2013.01)

(58) Field of Classification Search
CPC ........................... G06F 1/3203; G06F 2217/78

USPC ...................... 713/300–340; 703/18
See application file for complete search history.

(56) References Cited

U.S. PATENT DOCUMENTS

| 5,799,198 | A | | 8/1998 | Fung | |
|---|---|---|---|---|---|
| 5,940,779 | A | * | 8/1999 | Gaitonde et al. | 702/60 |
| 5,941,991 | A | * | 8/1999 | Kageshima | 713/340 |
| 6,055,640 | A | * | 4/2000 | Kageshima et al. | 713/320 |

(Continued)

FOREIGN PATENT DOCUMENTS

CN     1322952 A     11/2001

OTHER PUBLICATIONS

Yunsi Fei; Ravi, S.; Raghunathan, A.; Jha, N.K., "Energy-optimizing source code transformations for OS-driven embedded software," VLSI Design, 2004. Proceedings. 17th International Conference on , pp. 261-266, 2004.*

(Continued)

*Primary Examiner* — Faisal M Zaman
(74) *Attorney, Agent, or Firm* — Francis Lammes; Stephen J. Walder, Jr.; Parashos T. Kalaitzis

(57) ABSTRACT

A mechanism is provided for run-time task-level dynamic energy management. An instruction address for a first instruction of the application is mapped to a portion of application code in the application in response to an application being marked for energy management. A monitoring of the hardware resource activities is done for the portion of the application code. A level of energy management is then implemented for the portion of the application code based on a value of the tick indicator, resource activities, and an intensity indicator.

6 Claims, 4 Drawing Sheets

(56) References Cited

U.S. PATENT DOCUMENTS

| | | | | |
|---|---|---|---|---|
| 6,096,089 | A * | 8/2000 | Kageshima | 703/18 |
| 6,205,555 | B1 * | 3/2001 | Kageshima et al. | 713/300 |
| 7,200,763 | B2 * | 4/2007 | Williams | 713/320 |
| 7,287,173 | B2 * | 10/2007 | Hsieh | 713/320 |
| 7,340,628 | B2 * | 3/2008 | Pessolano | 713/340 |
| 7,673,160 | B2 * | 3/2010 | Peterson | 713/320 |
| 7,770,034 | B2 | 8/2010 | Nanja | |
| 7,995,034 | B2 * | 8/2011 | Pope et al. | 345/163 |
| 2002/0053684 | A1 | 5/2002 | Chauvel et al. | |
| 2004/0268159 | A1 * | 12/2004 | Aasheim et al. | 713/300 |
| 2008/0098242 | A1 * | 4/2008 | Peterson | 713/320 |
| 2008/0168290 | A1 * | 7/2008 | Jobs et al. | 713/324 |
| 2008/0301474 | A1 | 12/2008 | Bussa et al. | |
| 2009/0210740 | A1 | 8/2009 | Huang et al. | |
| 2010/0268975 | A1 * | 10/2010 | Bose et al. | 713/340 |
| 2010/0287559 | A1 * | 11/2010 | Mergen et al. | 718/103 |
| 2011/0004575 | A1 | 1/2011 | Yang et al. | |
| 2011/0067104 | A1 * | 3/2011 | Goncalves et al. | 726/22 |
| 2014/0075219 | A1 * | 3/2014 | Alapati et al. | 713/320 |
| 2014/0298058 | A1 * | 10/2014 | Klingauf et al. | 713/322 |

OTHER PUBLICATIONS

Simunic, T.; Benini, L.; De Micheli, G.; Hans, Mat, "Source code optimization and profiling of energy consumption in embedded systems," System Synthesis, 2000. Proceedings. The 13th International Symposium on , pp. 193-198, 2000.*

Fekete, Krisztian; Pelle, Adam; Csorba, Kristof, "Energy efficient code optimization in mobile environment," Telecommunications Energy Conference (INTELEC), 2014 IEEE 36th International , pp. 1-6, Sep. 28, 2014-Oct. 2, 2014.*

Gang Luo; Bing Guo; Yan Shen; HaiYan Liao; Lei Ren, "Analysis and Optimization of Embedded Software Energy Consumption on the Source Code and Algorithm Level," Embedded and Multimedia Computing, 2009. EM-Com 2009. 4th International Conference on , pp. 1-5, Dec. 10-12, 2009.*

U.S. Appl. No. 13/289,415, 1 page.

Evans, Jeffrey J., "On Performance and Energy Management in High Performance Computing Systems", 2010 39th International Conference on Parallel Processing Workshops, 2010, pp. 445-452.

Bazzaz, Mostafa et al., "An Accurate Instruction-Level Energy Estimation Model and Tool for Embedded Systems", IEEE Transactions on Instrumentation and Measurement, vol. 62, No. 7, Jul. 2013, pp. 1927-1934.

Benini, Luca et al., "A Survey of Design Techniques for System-Level Dynamic Power Management", IEEE Transactions on Very Large Scale Integration (VLSI) Systems, vol. 8, No. 3, Jun. 2000, pp. 299-316.

Brandolese, C. et al., "An Instruction-Level Functionality-based Energy Estimation Model for 32-bits Microprocessors", ACM, Design Automation Conference, Jun. 5-9, 2000, pp. 346-351.

* cited by examiner

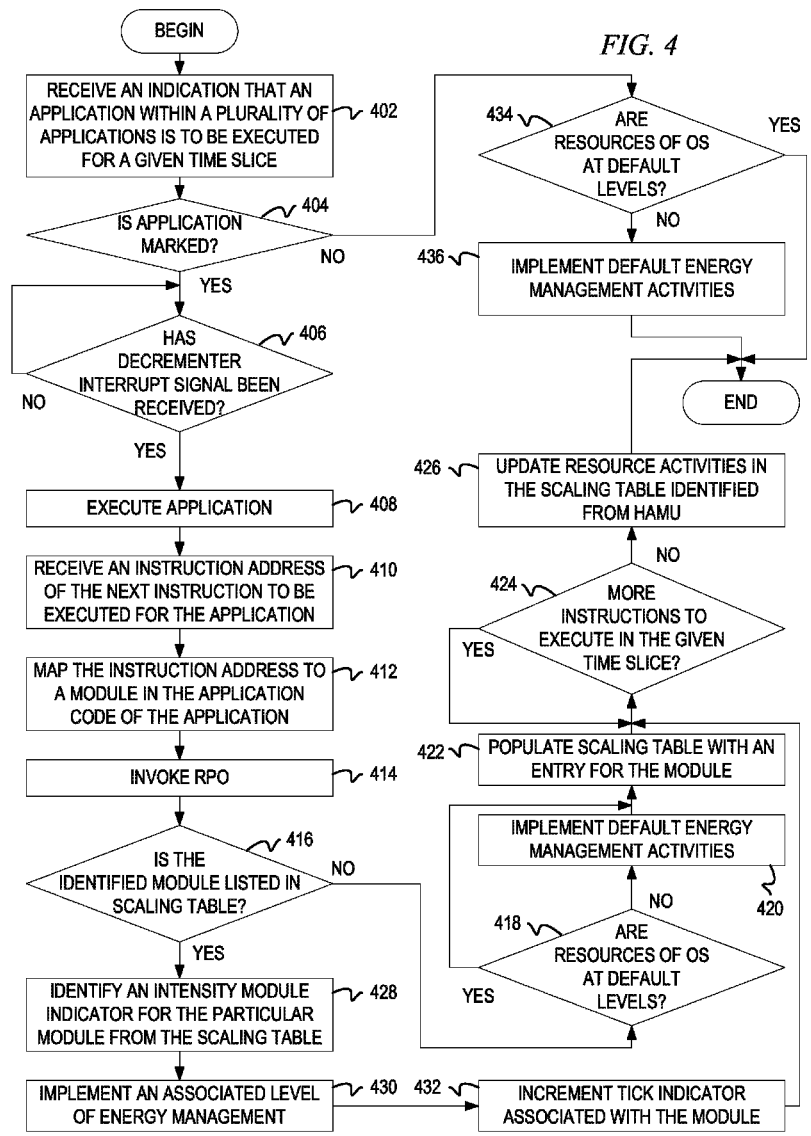

RUN-TIME TASK-LEVEL DYNAMIC ENERGY MANAGEMENT

BACKGROUND

The present application relates generally to an improved data processing apparatus and method and more specifically to mechanisms for run-time task-level dynamic energy management.

Power optimization is directed to optimizing (reducing) power consumption of a digital design, such as that of an integrated circuit, while preserving functionality. That is, the increasing speed and complexity of today's integrated circuit designs implies a significant increase in the power consumption of very-large-scale integration (VLSI) chips. To meet this challenge, researchers have developed many different design techniques to reduce power.

One key feature that led to the success of complementary metal-oxide semiconductor, or CMOS, technology is intrinsic low-power consumption. With CMOS technology, circuit designers and electronic design automation (EDA) tools are able to concentrate on maximizing circuit performance and minimizing circuit area. Another interesting feature of CMOS technology is its nice scaling properties, which has permitted a steady decrease in the feature size, allowing for more and more complex systems on a single chip, working at higher clock frequencies.

However, in light of the newest technologies, the increasing size of integrated circuits has contributed to the rise of power as a major design parameter. In fact, power consumption is regarded as the limiting factor in the continuing scaling of CMOS technology. To respond to this challenge, in the last decade or so, intensive research has been put into developing tools and techniques that address the problem of power optimization. But these techniques, system-wide and external, have often led to non-optimal results when deployed. That is, current power optimization techniques are currently blind to numerous aspects, such as applications and application workload.

SUMMARY

In one illustrative embodiment, a method, in a data processing system, is provided for run-time task-level dynamic energy management. Responsive to an application being marked for energy management, the illustrative embodiment maps an instruction address for a first instruction of the application to a portion of application code in the application. Responsive to the portion of the application code being listed in the scaling table, the illustrative embodiment identities an intensity indicator associated with the portion of the application code. The illustrative embodiment implements a level of energy management for the portion of the application code based on a value of the intensity indicator.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flow diagram of the operation performed by a run-time task-level dynamic energy management mechanism in accordance with an illustrative embodiment.

DETAILED DESCRIPTION

The illustrative embodiments provide mechanisms for relating dynamically varying application characteristics to the effect the varying application characteristics have on the data processing system in which the applications are executing. The mechanisms isolate and identify application behavior at a granular level, thereby providing timely optimization. The mechanisms store characteristics of various sections of the application during runtime. Accordingly, the mechanisms do not require a new learning phase every time a program section is executed. At the same time, the mechanisms do not neglect variations in program sections and optimize the system for power accordingly.

Figure 1:
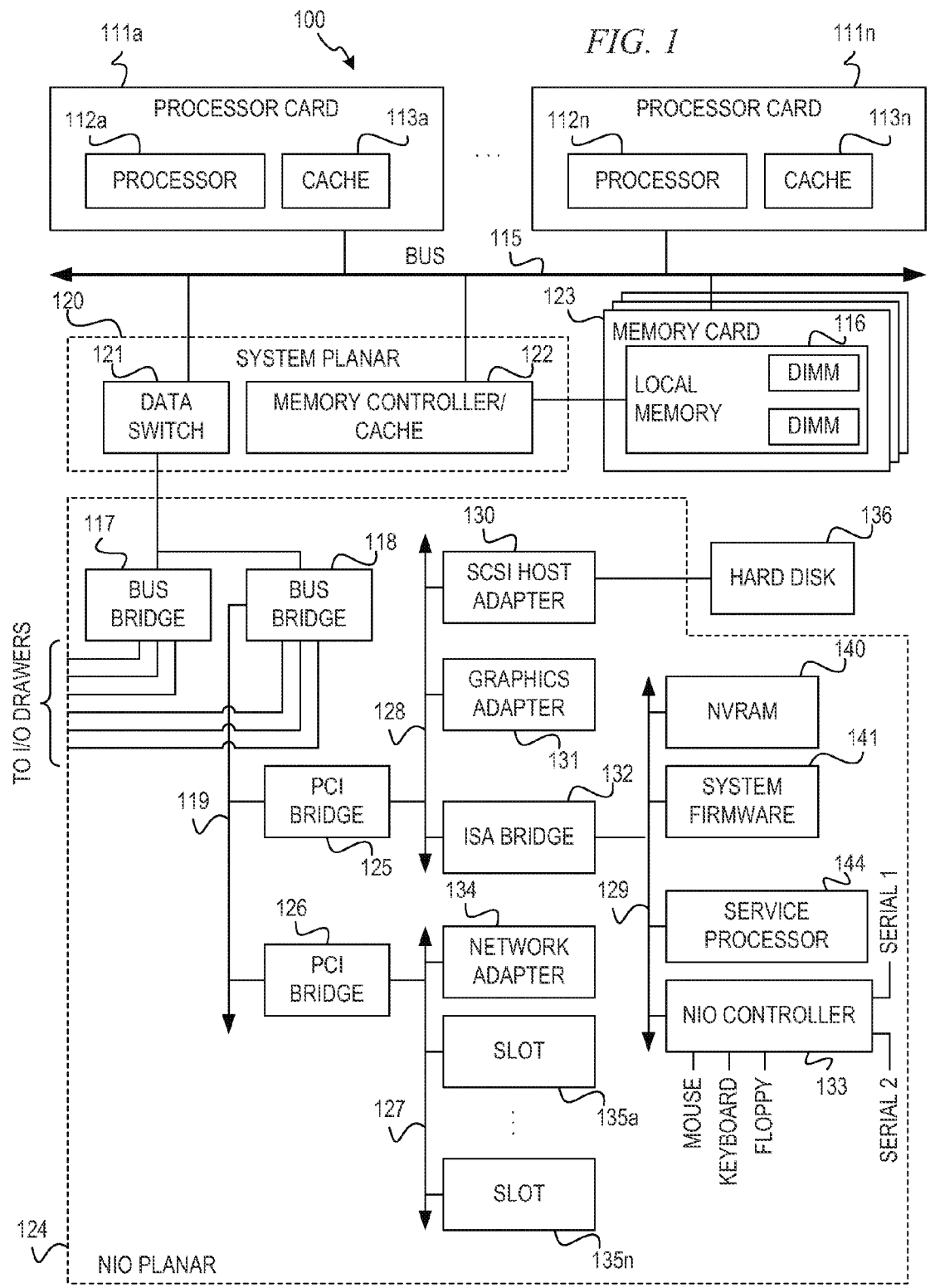
FIG. 1 depicts a block diagram of a data processing system with which aspects of the illustrative embodiments may advantageously be utilized.
Figure 2:
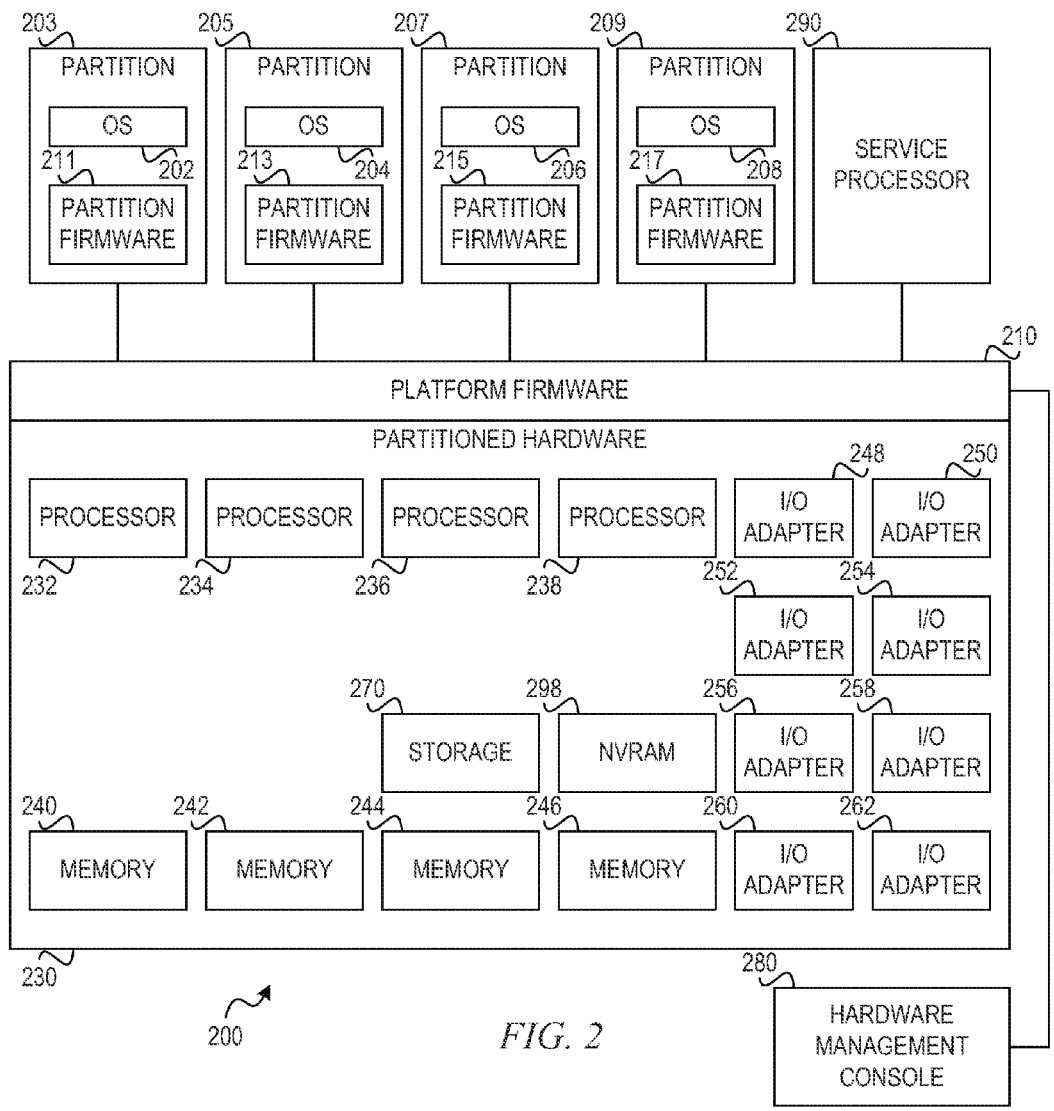
FIG. 2 is a block diagram of an exemplary logical partitioned platform in which exemplary aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing, system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

FIG. 2 is a block diagram of an exemplary logical partitioned platform in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and firmware 210. Operating systems 202, 204, 206, and 208 may be multiple copies of a single operating system or multiple heterogeneous operating systems simultaneously run on platform 200. These operating systems may be implemented using the AIX® operating system, the i5/OS™ operating system or the Linux™ operating system, for example, which are designed to interface with server firmware. Operating systems 202, 204, 206, and 208 are located in partitions 203, 205, 207, and 209.

Additionally, these-partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Firmware 210 performs a number of functions and services for partitions 203, 205, 207, and 209 to create and enforce the partitioning of logical partitioned platform 200. Firmware 210 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, firmware 210 allows the simultaneous execution of independent operating system images 202, 204, 206, and 208 by virtualizing all hardware resources of logical partitioned platform 200. Virtualization is the pooling of information technology resources in a way that shields the physical nature and boundaries of those resources from users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the i5/OS™ V5R3 operating system that allows one to create and manage one operating system logical partitions by initiating a console session using service tools.

Those of ordinary skill in the art will appreciate that the hardware in FIGS. 1 and 2 may vary depending on the implementation. Other internal hardware or peripheral devices, such as flash memory, equivalent non-volatile or optical disk drives and the like, may be used in addition to or in place of the hardware depicted in FIGS. 1 and 2. Also, the processes of the illustrative embodiments may be applied to a multiprocessor data processing system other than the SMP system mentioned previously without departing from the spirit and scope of the present invention.

Current partition-level energy management technologies address the energy management need at the partition-level. With these technologies, energy management decisions are taken across the entire system based on system-wide metrics. Thus, partition-specific energy and performance activity are not accounted-for leading to sub-optimal decisions for some partitions. Partition-level monitoring and decision-making addresses this problem to an extent. While this is fine grained as compared to the currently available solutions, even partition-level energy management fails to address applications and application workload.

In a single partition, there may be multiple applications executing. Each application's characteristics and pressures vary on the different resources associated with the partition. Thus, the illustrative embodiments provide a more fine-grained approach to ensure all the applications are provided an optimal energy management, especially in a performance-centric environment. The requirements of an application-specific energy management are multi-fold. That is, monitoring and management functions have to be targeted to each application white allowing for scheduling and other externalities. Any solution should scale with the number of applications without creating more than minimal overhead. Applications are managed by individual users as opposed to system administrators or data center managers who monitor whole systems or sets of partitions and the users should be able to control the way the energy management happens for their application. Further, since application characteristics may change over time based on the dataset under processing, the illustrative embodiments provide a dynamic learning-based approach to correlate application characteristics with hardware activity and, hence, optimize energy management decisions for each scenario.

Figure 3:
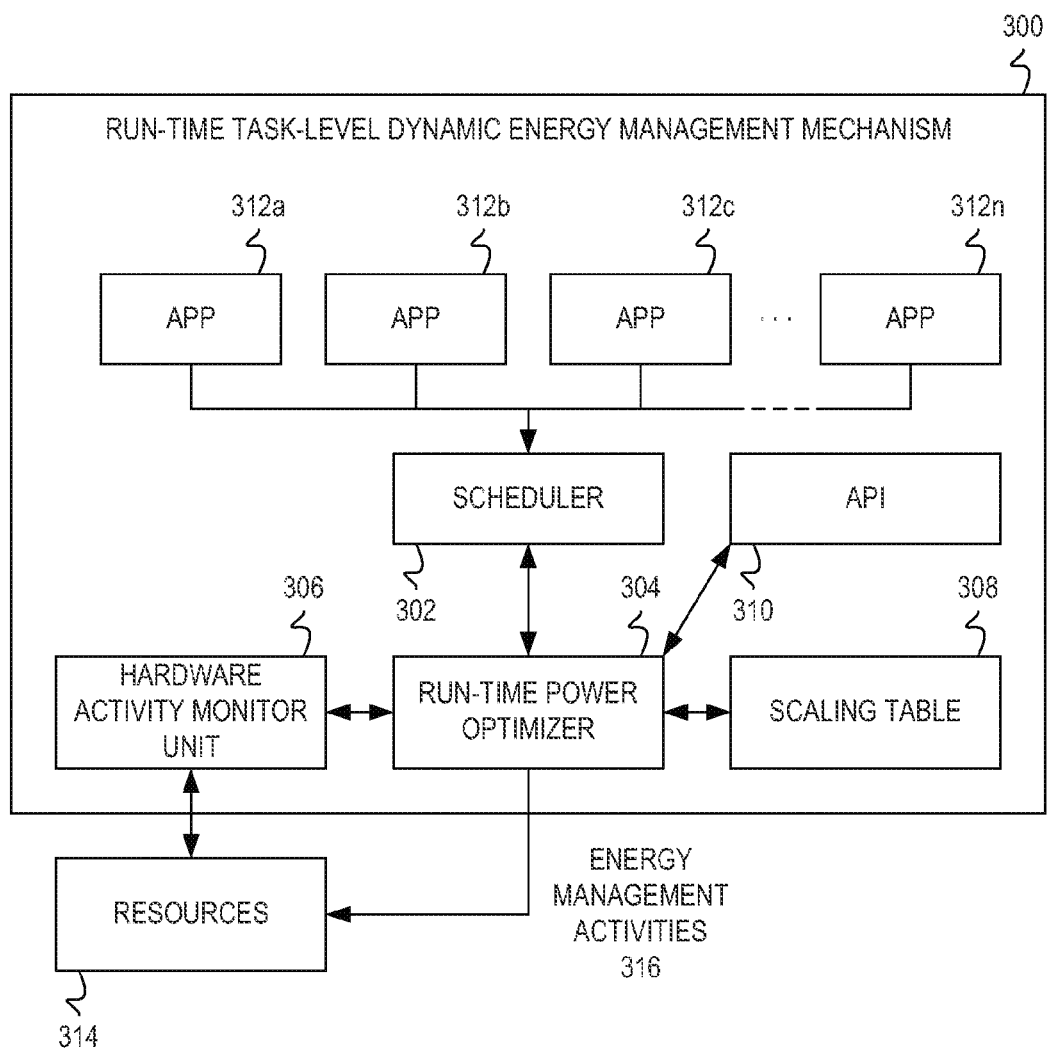
FIG. 3 depicts a functional block diagram of a run-time task-level dynamic energy management mechanism in accordance with an illustrative embodiment.

FIG. 3 depicts a functional block diagram of a run-time task-level dynamic energy management mechanism in accordance with an illustrative embodiment. Run-time task-level dynamic energy management mechanism 300 comprises scheduler 302, run-time power optimizer (RPO) 304, hardware activity monitoring unit (HAMU) 306, scaling table 308, and application programming interface (API) 310.

Scheduler 302 monitors applications 312a-312n as they are executed by an operating system, such as operating system 202, 204, 206, or 208 of FIG. 2. In accordance with the illustrative embodiments, each of applications 312a-312n may be marked using, for example, a "To Optimize" flag or a "Do Not Optimize" flag. If scheduler 302 determines that an application is marked with the exemplary "Do Not Optimize" flag, scheduler 302 does not perform any energy management with regard to a, as such, marked application. If scheduler 302 determines that an application is marked with the exemplary "To Optimize" flag, scheduler 302 performs energy management as described in the following. Thus, the illustrative embodiments isolate applications that should not be interfered with.

If, for example, application 312a is marked with the exemplary. "To Optimize" flag, scheduler 302 waits for a decrementer interrupt signal that signals a time-out of a current process/application that is executing in a current time slice so as to run application 312a in a next time slice. In the next time slice, scheduler 302 receives an instruction address of the next instruction to be executed within application 312a. Scheduler 302 then maps the instruction address to a portion of application 312a, such as a module, function, sub-routine, or the like, in the application code of application 312a using application binary details, application source details, operating system source details, or the like. Upon identification of, for example, a module within the application code of application 312a, scheduler 302 invokes RPO 304 of the module's execution within an application 312a, which is marked for energy management optimization.

Upon invocation, RPO 304 determines whether the identified module is listed in scaling table 308. If RPO 304 determines that the identified module is not listed in scaling table 308, then RPO 304 implements default energy management activities since no previous setting for energy management is available in scaling table 308. In order to implement the default energy management activities, RPO 304 determines whether resources associated with the operating system executing the application are at default energy management levels. If the resources are running at previously set energy management levels from a previous application, then RPO 304 may implement default energy management activities for the execution of application 312a. The default energy management settings may be set by a user, an administrator, factory default setting, or the like. If the resources are running at the default energy management level or if RPO 304 has implemented the default energy management activities, then RPO 304 populates scaling table 308 with an entry for the module as well as associated content. For example, the entry may comprise a module identifier, an intensity indicator, derived characteristics, a scaling factor, a tick indicator, or the like. The module identifier refers to various components of the application, such as the module, function, sub-routine, basic-block, or the like. The intensity indicator indicates the amount of energy the module consumes during the run-time of the application. As would be evident to one of ordinary skill in the art, different modules within the application may consume different amounts of energy. Therefore, RPO 304 uses the intensity indicator to differentiate one module from another, for examples, using a high, medium-high, medium, medium-low, and low indicator. The derived characteristics section of scaling table 308 comprises raw data associated with resource activities on resources 314 triggered by the module of the application and identified by HAMU 306. The scaling factor identifies a voltage/frequency scaling factor that will be implemented whenever the corresponding module of the application is executed, RPO 304 may update the scaling factor with each additional execution of the respective module. Tick indicator is a unit that is directly proportional to the frequency of occurrence of the module. Each time the module is executed, RPO 304 increments the tick indicator associated with that module, which may cause a change in the intensity indicator. Thus, RPO 304 maintains various tables and data structures for the determination of a scaling frequency associated with each module, RPO 304 is always in a learning phase and determines the best suited scaling from previous decisions and current activity.

As indicated previously, HAMU 306 monitors resource activities on resources 314 triggered by an executing module with application 312a, HAMU 306 fetches the raw data from processors, memory units, NVRAM storage, I/O adapters, or other resources within the data processing system and provides such data to RPO 304. API 310 may be internal or external to RPO 304 and may be invoked by RPO 304 to convert raw hardware activity data from HAMU 306 to a cumulative number that may be used to determine an overall characteristic of the module, RPO 304 may, in turn, use the cumulative number to determine or update a scaling factor for the respective module.

If RPO 304 determines that the identified module is already listed in scaling table 308, RPO 304 identifies the intensity indicator for the particular module from scaling table 308. Based on the current intensity indicator, RPO 304 implements an associated level of energy management. Based on the identified level of energy management, RPO 304 may perform one or more of a number of energy management activities 316, such as frequency scaling, voltage scaling, scale down power in one or memories responsive to memory characteristics indicating low memory activity, reduce cooling as cooling requirements come down due to less heat dissipation resultant from frequency and voltage scaling, or other energy management activities. One note to make is that some levels of energy management may require more than one energy management activity while other levels of energy management may require no implementation of energy management activities whatsoever. Regardless of the current identified intensity indicator, RPO 304 increments the tick indicator associated with the module. By incrementing the tick indicator, a module's intensity may increase over time indicating the importance of the module. At this time, RPO 304 may also update resource activities received from HAMU 306.

In addition to implementing energy management activities when applications are marked for energy management, scheduler 302 and RPO 304 may implement default energy management activities for those applications that are not marked for energy management. If for example, application 312*n* is marked with the exemplary "Do Not Optimize" flag, scheduler 302 waits (or a decrementer interrupt signal that signals a time-out of a current process/application that is executing in a current time slice so as to run application 312*n* in a next time slice. In the next time slice, scheduler 302 notifies RPO 304 that application 312*n* is executing and RPO 304 determines whether resources associated with the operating system executing the application are at default energy management levels. If the resources are running at previously set energy management levels from a previous application, then RPO 304 may implement default energy management activities for the execution of application 312*n*. The default energy management settings may be set by a user, an administrator, factory default setting, or the like. If the resources are running at the default energy management level, then scheduler 302 continues with execution of application 312*n*.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RE), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 4 depicts a flow diagram of the operation performed by a run-time task-level dynamic energy management mechanism in accordance with an illustrative embodiment. As the operation begins, a scheduler within the run-time task-level dynamic energy management mechanism receives an indication that an application within a plurality of applications is to be executed for a next time slice (step 402). The scheduler determines whether the application is identified as an application for which energy management should be performed (step 404). If at step 404 the application is marked for energy management, then the scheduler determines whether a decrementer interrupt signal that signals a time-out of a current process/application that is executing in a current time slice no as to run the requesting application in a next time slice has been received (step 406). If at step 406 the decrementer signal has not been received, then the scheduler continues to wait. If at step 406 the decrementer signal is received, then the scheduler executes the application (step 408) and the scheduler receives an instruction address of the next instruction to be executed for the application (step 410).

The scheduler maps the instruction address to a portion of the application, for example, a module, in the application code of the application using application binary details, application source details, operating system source details, or the like (step 412). Upon identification of the module within the application code of the application, the scheduler invokes a run-time power optimizer (RPO) of the module's execution (step 414). Upon invocation, the RPO determines whether the identified module is listed in a scaling table (step 416). If at step 416 the RPO determines that the identified module is not listed in the scaling table, the RPO implements default energy management activities by determining whether resources associated with the operating system executing the application are at default energy management levels (step 418). If at step 418 the resources are not running default energy management levels, then the RPO implements default energy management activities for the execution of the application (step 420). If at step 418 the resources are running default energy management levels or from step 420, the RPO populates the scaling table with an entry for the module (step 422). The scheduler then determines if there are more instructions to execute (step 424). If at step 424 there are more instructions to execute, then the operation continues to execute the instruction in the current time slice. If at step 424 there are no more instructions to execute for the application in the current time slice, the RPO updates resource activities in the scaling table identified from a hardware activity monitor unit (HAW) (step 426), with the operation ending for the application during the current time slice.

if at step 416 the RPO determines that the identified module is listed in the scaling table, the RPO identifies an intensity indicator for the particular module from the scaling table (step 428). Based on the current intensity indicator, the RPO implements an associated level of energy management (step 430). Based on the identified level of energy management, the RPO may perform one of a number of energy management activities, such as frequency scaling, voltage scaling, scale down power in one or memories responsive to memory characteristics indicating low memory activity, reduce cooling as cooling requirements come down due to less heat dissipation resultant from frequency and voltage scaling, or other energy management activities. One note to make is that some levels of energy management may require more than one energy management activity while other levels of energy management may require no implementation of energy management activities whatsoever. Regardless of the current identified intensity indicator, the RPO increments the tick indicator associated with the module (step 432). By incrementing the tick indicator, a module's intensity may increase over time indicating the importance of the module. The operation then proceeds to step 424 thereafter.

If at step 404 the application is not marked for energy management, then the RPO implements default energy management activities by determining whether resources associated with the operating system executing the application are at default energy management levels (step 434). If at step 434 the resources are not running default energy management levels, then the RPO implements default energy management activities for the execution of the application (step 436). If at step 434 the resources are running default energy management levels or from step 436, the operation ends for that application during the current time slice.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for relating dynamically varying application characteristics to the effect the varying application characteristics have on the data processing system in which the applications are executing. The mechanisms isolate and identify application behavior at a granular level, thereby providing timely optimization. The mechanisms store characteristics of various sections of the application during runtime. Accordingly, the mechanisms do not require anew learning phase every time a program section is executed. At the same time, the mechanisms do not neglect variations in program sections and optimize the system for power accordingly.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable moderns and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for run-time task-level dynamic energy management, the method comprising:
    responsive to an application being marked for energy management, mapping an instruction address for a first instruction of the application to a portion of application code in the application;
    responsive to the portion of the application code being listed in a scaling table, identifying an intensity indicator associated with the portion of the application code; and
    implementing a level of energy management for the portion of the application code based on a value of the intensity indicator; and
    incrementing a tick indicator associated with the portion of the application code, wherein a level of the tick indicator indicates an importance of the portion of the application code and increases the intensity indicator as the level of the tick indicator increases.

2. The method of claim 1, wherein implementing the level of energy management further comprises implementing one or more energy management activities for a set of resources associated with an operating system executing the application and wherein the energy management activities comprise frequency scaling, voltage scaling, scaling down power in one or memories, or reducing cooling.

3. The method of claim 1, further comprising:
repeating the mapping, identification, and implementation steps fir each subsequent portion of the application code.

4. The method of claim 1, further comprising:
responsive to the portion of the application code failing to be listed in the scaling table, determining whether a set of resources associated with an operating system executing the application are operating a default energy management level;
responsive to the set of resources associated with the operating system executing the application failing to operate at the default energy management level, implementing one or more energy management activities for a set of resources so that the set of resources are operating at the default energy management level; and
populating the scaling table with an identifier of the portion of the application code and associated content.

5. The method of claim 4, further comprising:
responsive to the set of resources associated with the operating system executing the application operating at the default energy management level, populating the scaling table with the identifier of the portion of the application code and the associated content.

6. The method of claim 1, further comprising:
responsive to the application failing to be marked for energy management, determining whether a set of resources associated with an operating system executing the application are operating a default energy management level; and
responsive to the set of resources associated with the operating system executing the application failing to operate at the default energy management level, implementing one or more energy management activities for a set of resources so that the set of resources are operating at the default energy management level.

\* \* \* \* \*